UNITED STATES PATENT OFFICE.

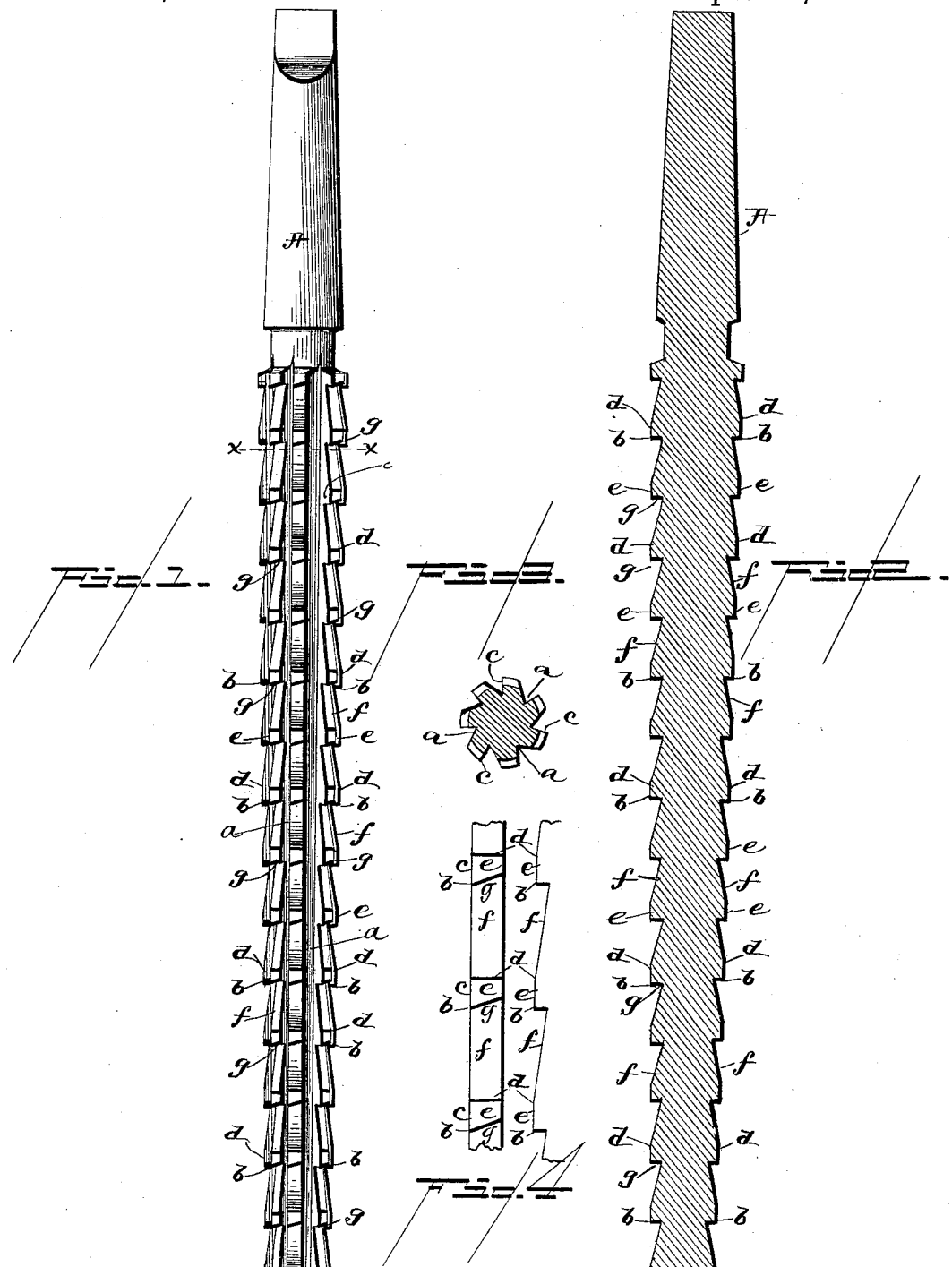

STEPHEN HIPKINS, JR., OF MARTIN'S FERRY, OHIO.

REAMING-TOOL.

SPECIFICATION forming part of Letters Patent No. 390,080, dated September 25, 1888.

Application filed August 10, 1888. Serial No. 282,404. (No model.)

*To all whom it may concern:*

Be it known that I, STEPHEN HIPKINS, Jr., a citizen of the United States, residing at Martin's Ferry, in the county of Belmont and State of Ohio, have invented new and useful Improvements in Reaming-Tools, of which the following is a specification.

My invention relates to tools for reaming or counterboring in metal-working; and my improvement consists of a reaming-tool having cutters formed upon a series of truncated cones, in which the truncated end of one cone joins the base of the superposed cone throughout the length of the stock, and in which the salient cutting-edges of the cutters of each cone stand in the plane of the base of each cone and are separated by longitudinal grooves, whereby each truncated cone throughout the length of the stock is formed of a group of cutters each having circumferential and side clearance-spaces, and in which each group of cutters has a separate and distinct line of action following each other in steps in succession from the point to the shank of the stock.

The object of my improvement is to produce a taper reamer for preliminary or roughing work to remove the stock before using the smooth-line reamer, and thus save considerable time in reaming out a hole.

The improved construction reduces the friction of the tool to a minimum, and thereby greatly relieves the strain upon the machine driving it. The taper form and the construction leave the hole in steps or ridges, and thus prepare it for the finishing straight-line reamer, which only takes out the steps and brings the hole to a uniform smooth surface, thus doing the work in a few minutes which would require hours with a straight reamer only. By thus dividing the work between a roughing taper and a straight finishing reamer the work of both is quicker and easier than is possible in using a number of straight reamers to complete the work. While my improved reamer works on a taper each cone forms a drill which works on a straight line through the work, and the taper causes no binding action throughout the series of cones, and the work is left for a comparatively easy finish, with one boring of a straight reamer doing the work in a few minutes which usually requires hours.

A more specific statement of the points of novelty will be found in the claims concluding this specification.

The following is a description of the drawings, in which is illustrated my improved metal-reaming tool.

Figure 1 represents a longitudinal view of a reamer or broach constructed in accordance with my invention; Fig. 2, a longitudinal section of the same; Fig. 3, a cross-section on the line $x\ x$ of Fig. 1; and Fig. 4 shows the form of the cutters enlarged.

The stock may be of any suitable diameter and length and is of taper form throughout its length. It is divided into truncated cones, preferably of equal length, in which the truncated apex of one cone joins the base of the superposed cone, and the entering end of the tool will terminate at the base of the cone.

The circumference of the stock is formed with a series of longitudinal grooves, $a$, extending through the series of superposed truncated cones, so that each truncated cone is formed of a series of circumferential cutters having their cutting-points $b$ in the same transverse plane, so that the cutters of each cone will enter the bore at the base of each cone. This construction makes each conoidal section of the stock a distinct cutting-body having a group of distinct cutting-faces, each formed of three sides, as I will now describe.

Each tooth of each cutter has a side face, $c$, which stands in the groove $a$ and extends from the salient point $b$ to the point $d$, a circumferential face, $e$, parallel with the axis of the stock, a circumferential face, $f$, inclined to the axis of the stock, and an end beveled face, $g$, so that the cutter proper of each tooth is like the point of a circular-saw tooth having a side instead of an end cutting-face, $c$. By this construction the beveled end $g$ of each cutter-tooth overhangs the inclined circumferential surface $f$ of the adjacent tooth, and the longitudinal line of teeth will form cutting-edges similar to the teeth of a circular saw if projected in a plane. By this construction the tool is formed of superposed conoidal sections, each cone-section having the cutters formed at its base and extending toward the apex, so as to give a clearance for each tooth around the apex of the cone and at its junction with the cutters of the superposed conoidal section.

A is the shank by which the tool is secured in the arbor of the lathe by which it is actuated, and which holds the tool in proper axial relation to the already-formed hole or bore of the article being worked.

By dividing the stock into a series of truncated cones I am enabled to form it into a series of separate and distinct cutting-sections throughout its length, and by dividing the stock into conoidal sections having longitudinal lines of cutters it is thereby caused to work with comparatively light pressure and ease under the feed of the projecting screw and makes an efficient roughing-reamer.

What I claim as my invention is—

1. A reaming-tool formed of a series of truncated cones, each cone having a group of cutting-teeth formed of longitudinal grooves, and having their cutting-points in a plane with the base of the cone, substantially as described.

2. A reaming-tool having a series of longitudinal lines of teeth formed upon conoidal superposed sections, with their cutting-points in a plane with the base of the cone, and having circumferential faces formed in lines both parallel with and at an angle to the axis of the tool, substantially as described.

3. A reaming-tool having longitudinal lines of cutters formed with radial cutting-faces, oblique ends, and circumferential faces, as $e$ and $f$, having a parallel and an inclined relation to the axis of the tool, substantially as described.

4. As a new article of manufacture, a reaming-tool formed of longitudinal lines of cutters divided into transverse conoidal sections, the truncated end of one section joining the base of the superposed section in the transverse plane of the cutting-points of the teeth of each section, substantially as described.

In testimony whereof I have hereunto set my hand in the presence of two subscribing witnesses.

STEPHEN HIPKINS, Jr.

Witnesses:
JAMES LINDER,
WM. HARRISON.